US012781081B2

(12) United States Patent
Koyama

(10) Patent No.: US 12,781,081 B2
(45) Date of Patent: Nov. 3, 2026

(54) INK SET AND INKJET RECORDING APPARATUS

(71) Applicant: KYOCERA Document Solutions Inc., Osaka (JP)

(72) Inventor: Akinori Koyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 131 days.

(21) Appl. No.: 18/763,181

(22) Filed: Jul. 3, 2024

(65) Prior Publication Data

US 2025/0019557 A1 Jan. 16, 2025

(30) Foreign Application Priority Data

Jul. 13, 2023 (JP) ................................ 2023-115445

(51) Int. Cl.

| | |
|---|---|
| ***C09D 11/322*** | (2014.01) |
| ***B41J 2/165*** | (2006.01) |
| ***C09D 9/04*** | (2006.01) |
| ***C09D 11/033*** | (2014.01) |
| ***C09D 11/38*** | (2014.01) |
| ***C09D 11/40*** | (2014.01) |
| ***C09D 11/54*** | (2014.01) |

(52) U.S. Cl.

CPC ........... *C09D 11/40* (2013.01); *B41J 2/16552* (2013.01); *C09D 9/04* (2013.01); *C09D 11/033* (2013.01)

(58) Field of Classification Search

CPC ........ C09D 11/40; C09D 9/04; C09D 11/033; C09D 11/322; C09D 11/38; C09D 11/54; B41J 2/16552

See application file for complete search history.

(56) References Cited

U.S. PATENT DOCUMENTS

| | | | | |
|---|---|---|---|---|
| 10,569,587 | B1 * | 2/2020 | Sowinski ............. | B41M 5/0023 |
| 2012/0306964 | A1 * | 12/2012 | Nakajima ............ | C09D 11/322 347/54 |

FOREIGN PATENT DOCUMENTS

| | | | | | |
|---|---|---|---|---|---|
| CN | 1430667 | A | * | 7/2003 | ......... C03C 23/0075 |
| JP | 2010150326 | A | * | 7/2010 | |
| JP | 2016-175951 | A | | 10/2016 | |
| JP | 2021030482 | A | * | 3/2021 | |

OTHER PUBLICATIONS

ROTH's 1,2-Hexanediol Safety Data Sheet (SDS) ("Factual Reference 1") (Year: 2020).*
Sigma-Aldrich's Di(propylene glycol) methyl ether Safety Data Sheet (SDS) ("Factual Reference 2") (Year: 2025).*
CN1430667A_Espacenet English translation_Annotated (Year: 2003).*

* cited by examiner

*Primary Examiner* — Ricardo I Magallanes
*Assistant Examiner* — Shlomit Chelst
(74) *Attorney, Agent, or Firm* — Studebaker Brackett PLLC

(57) ABSTRACT

An ink set includes an inkjet ink and a cleaning liquid. The inkjet ink contains a pigment and a first aqueous medium. The first aqueous medium contains a hydrophobic solvent and water. The inkjet ink has a viscosity at 25° C. of at least 120 mPa·S and no greater than 3800 mPa·S after a drying treatment. The drying treatment is a treatment to heat the inkjet ink at 40° C. until the mass of the inkjet ink is reduced by 30.00% by mass. The cleaning liquid contains poly(meth)acrylic acid, a surfactant, and a second aqueous medium. The poly(meth)acrylic acid has a percentage content of at least 0.15% by mass and no greater than 10.50% by mass in the cleaning liquid.

5 Claims, 4 Drawing Sheets

INK SET AND INKJET RECORDING APPARATUS

INCORPORATION BY REFERENCE

The present application claims priority under 35 U.S.C. § 119 to Japanese Patent Application No. 2023-115445, filed on Jul. 13, 2023. The contents of this application are incorporated herein by reference in their entirety.

BACKGROUND

The present disclosure relates to an ink set and an inkjet recording apparatus.

Inkjet recording apparatuses are required to be able to form images with desired image density. As an example of the method for forming images with desired image density using an inkjet recording apparatus, a method is proposed that uses an inkjet ink which quickly dries and which increases in viscosity after landing on a recording medium as an inkjet ink.

However, when inkjet ink attached to the ink ejection surface of a recording head dries and increases its viscosity, the viscosity of the inkjet ink becomes excessively high in drying, leading to insufficient ejection stability of the inkjet ink. Furthermore, once the inkjet ink which quickly increases its viscosity by drying is attached to the ejection surface of a recording head, quickly drying of the inkjet ink causes its pigment to adhere to the ejection surface. As a result, the inkjet ink attached to the ejection surface cannot be thoroughly removed even by cleaning with a typical cleaning liquid.

Under the above circumstances, an ink set including an inkjet ink and a cleaning liquid, as well as an inkjet recording apparatus using the ink set, is required to able to form images with desired image density and facilitate removal of inkjet ink by cleaning.

SUMMARY

An ink set according to an aspect of the present disclosure includes an inkjet ink and a cleaning liquid. The inkjet ink contains a pigment and a first aqueous medium. The first aqueous medium contains a hydrophobic solvent and water. The inkjet ink has a viscosity at 25° C. of at least 120 mPa·S and no greater than 3800 mPa·S after a drying treatment. The drying treatment is a treatment to heat the inkjet ink at 40° C. until a mass of the inkjet ink is reduced by 30.00% by mass. The cleaning liquid contains poly(meth)acrylic acid, a surfactant, and a second aqueous medium. The poly(meth) acrylic acid has a percentage content of at least 0.15% by mass and no greater than 10.50% by mass in the cleaning liquid.

An inkjet recording apparatus according to another aspect of the present disclosure includes an inkjet ink, a cleaning liquid, and a recording head. The recording head includes a recording section that has an ink ejection surface and that ejects the inkjet ink onto an image formation area of a recording medium and a cleaning section that cleans the ink ejection surface of the recording section with the cleaning liquid. The inkjet ink contains a pigment and a first aqueous medium. The first aqueous medium contains a hydrophobic solvent and water. The inkjet ink has a viscosity at 25° C. of at least 120 mPa·S and no greater than 3800 mPa·S after a drying treatment. The drying treatment is a treatment to heat the inkjet ink at 40° C. until a mass of the inkjet ink is reduced by 30.00% by mass. The cleaning liquid contains poly(meth)acrylic acid, a surfactant, and a second aqueous medium. The poly(meth)acrylic acid has a percentage content of at least 0.15% by mass and no greater than 10.50% by mass in the cleaning liquid.

DETAILED DESCRIPTION

Figure 1:
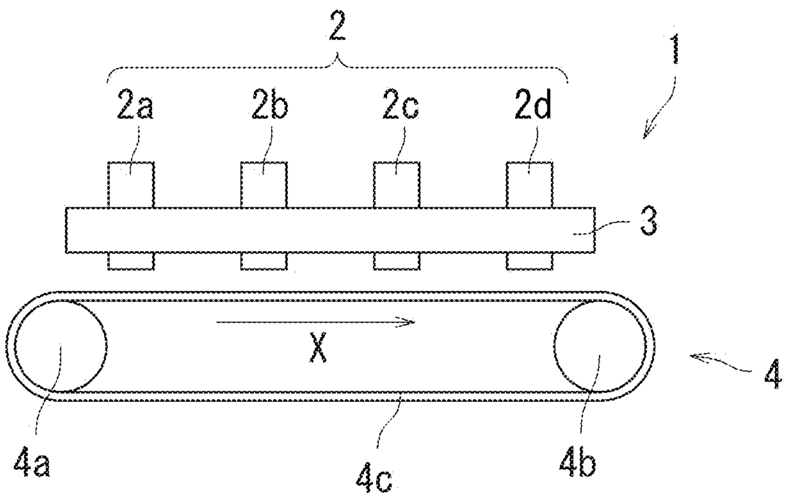
FIG. 1 is a diagram illustrating an example of an inkjet recording apparatus according to a second embodiment of the present disclosure.

The following descries embodiments of the present disclosure. Note that in the following, measurement values for volume median diameter ($D_{50}$) are values as measured using a dynamic light scattering type particle size distribution analyzer (e.g., "ZETASIZER NANO ZS", product of Malvern Instruments Ltd.) unless otherwise stated.

Where there is a literature value for octanol/water partition coefficient Log P of an organic solvent, the literature value can used directly for the organic solvent.

Where there is no literature value therefor by contrast, a value calculated using calculation software (e.g. "CHEMDRAW", product of PerkinElmer Japan Co., Ltd.) can be used for the organic solvent.

Values for viscosity (initial viscosity) of an ink before a drying treatment and for viscosity (dry viscosity) after the drying treatment are values as measured at 25° C. using a rotary viscometer (e.g., "TV-100EL", product of Toki Sangyo Co., Ltd.).

Values for mass average molecular weight (Mw) are values as measured by gel permeation chromatography unless otherwise state.

In the present specification, the term "(meth)acryl" is used as a generic term for both acryl and methacryl. One type of each component described in the present specification may be used independently, or two or more types of the component may be used in combination. The phrase "at least one of A and B" means "either or both A and B".

First Embodiment: Ink Set

The following describes an ink set according to a first embodiment of the present disclosure. The ink set according to the present embodiment includes an inkjet ink (also referred to below simply as an ink) and a cleaning liquid. The ink contains a pigment and a first aqueous medium. The first aqueous medium contains a hydrophobic solvent and water. The ink has a viscosity at 25° C. of at least 120 mPa·S and no greater than 3800 mPa·S after a drying treatment. The drying treatment is a treatment to heat the ink at 40° C. until the mass of the ink is reduced by 30.00% by mass. The cleaning liquid contains poly(meth)acrylic acid, a surfactant, and a second aqueous medium. The poly(meth)acrylic acid has a percentage content of at least 0.15% by mass and no greater than 10.50% by mass in the cleaning liquid.

As a result of having the above features, the ink set according to the present embodiment can form images with desired image density and can facilitate removal of the ink by cleaning. The reasons why the ink set of the present embodiment can achieve the above effects can be inferred as follows.

According to the ink set of the present embodiment, the ink contains a pigment and a first aqueous medium containing a hydrophobic solvent and water as described above. Therefore, when its moisture is reduced by drying, the ink of the ink set according to the present embodiment becomes hydrophobic. As the hydrophobicity of the ink increases, the pigment contained in the ink agglomerates to increase the viscosity of the ink. As such, the ink of the ink set according to the present embodiment readily increases its viscosity (a viscosity (dry viscosity) at 25° C. after the drying treatment of at least 120 mPa·S and no greater than 3800 mPa·S) due to pigment agglomeration upon moisture loss by drying. An ink that tends to increase its viscosity by drying, such as above, quickly increases its viscosity after landing on a recording medium to form images with high image density by allowing its pigment to remaining near the surface of the recording medium. Thus, the ink of the ink set according to the present embodiment can form images with desired image density.

However, once the inkjet ink that quickly dries and increases its viscosity is attached to the ejection surface of a recording head, the ink quickly dries, and its pigment adheres to the ejection surface. As a result, the ink attached to the ejection surface cannot be thoroughly removed even by cleaning with a typical cleaning liquid. The inventors of the present application have diligently studied and find that poly(meth)acrylic acid has a function of enhancing cleaning ability of a cleaning liquid against inks that readily increase in viscosity to a high dry viscosity by drying as described above, and can effectively serve as a builder. Furthermore, poly(meth)acrylic acid enhances the aforementioned cleaning ability of a cleaning liquid against inks more effectively than typical builders. The cleaning liquid containing poly (meth)acrylic acid with a percentage content of at least 0.15% by mass and no greater than 10.50% by mass has excellent ink removal performance as described above. Consequently, a combination of the above-described ink and the above-described cleaning liquid can provide an ink set that can form images with desired image density and that can readily remove the ink by cleaning.

The ink set according to the present embodiment is described further in detail below.

[Ink]

The ink contains a pigment and a first aqueous medium. Preferably, the ink further contains at least one of a pigment coating resin and a surfactant.

The ink has a viscosity at 25° C. of at least 120 mPa·S and no greater than 3800 mPa·S after the drying treatment, preferably at least 120 mPa·S and no greater than 1750 mPa·S, and further preferably at least 120 mPa·S and no greater than 200 mPa·S. As a result of having a viscosity at 25° C. of at least 120 mPa·S after the drying treatment, the ink can form images with desired image density. As a result of the ink having a viscosity at 25° C. of no greater than 3800 mPa·S after the drying treatment, the cleaning liquid can easily remove the ink from the ejection surface of a recording head. This can optimize ink ejection stability of an inkjet recording apparatus using the ink set.

Note that the drying treatment is a treatment to heat the ink according to the present embodiment at 40° C. until the mass of the ink is reduced by 30.00% by mass. As to a specific method for drying treatment (heating treatment), the method described in Examples or a method in accordance therewith can be employed.

The viscosity of the ink at 25° C. (viscosity before the drying treatment) is preferably at least 7.0 mPa·S and no greater than 10.0 mPa·S, and more preferably at least 7.0 mPa·S and no greater than 8.0 mPa·S. As a result of the viscosity of the ink at 25° C. being set to at least 7.0 mPa·S and no greater than 10.0 mPa·S, formation of images with desired image density can be ensured.

(Pigment)

The pigment contained in the ink constitutes pigment particles together with the pigment coating resin, for example. The pigment particles each include a core containing the pigment and the pigment coating resin covering the core, for example. The pigment coating resin is present in a dispersed state in the first aqueous medium, for example. In terms of optimizing color density, hue, or stability of the ink in the present embodiment, the pigment particles have a volume median diameter ($D_{50}$) of preferably at least 30 nm and no greater than 300 nm, and more preferably at least 90 nm and no greater than 130 nm.

Examples of the pigment include yellow pigments, orange pigments, red pigments, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, specifically 15:3). Examples of the violet pigments include C.I. Pigment Violet (19, 23, or 33). Examples of the black pigments include C.I. Pigment Black (7).

The pigment has a percentage content of preferably at least 2.00% by mass and no greater than 15.00% by mass in the ink, and more preferably at least 5.00% by mass and no greater than 10.00% by mass. As a result of the percentage content of the pigment being set to at last 2.00% by mass, formation of images with desired image density with the ink can be facilitated. As a result of the percentage content of the pigment being set to no greater than 15.00% by mass by contrast, the ink can be reliably removed from the ejection surface of a recording head using the cleaning liquid. This can optimize ink ejection stability of the inkjet recording apparatus.

(Pigment Coating Resin)

The pigment coating resin is deposited on the surface of the pigment to optimize dispersion stability of the pigment in the first aqueous medium. Note that a portion of the pigment coating resin may not be deposited on the surface of the pigment and remain free in the first aqueous medium. Examples of the pigment coating resin include polyether resin, (meth)acrylic resin, styrene-(meth)acrylic resin, and styrene-maleic acid resin. A commercially available product of the pigment coating resin may be "DISPERBYK (registered Japanese trademark)-190" produced by BYK Chemie Japan, K.K., for example.

The pigment coating resin has a percentage content of preferably at least 0.30% by mass and no greater than 3.50% by mass in the ink, and more preferably at least 1.00% by mass and no greater than 2.00% by mass. As a result of the percentage content of the pigment coating resin being set to at last 0.30% by mass, formation of images with desired image density with the ink can be facilitated. As a result of the percentage content of the pigment coating resin being set to no greater than 3.50% by mass, the cleaning liquid can reliably remove the ink from the ejection surface of a recording head. This can optimize ink ejection stability of the inkjet recording apparatus.

(First Aqueous Medium)

The first aqueous medium contains a hydrophobic solvent and water. The first aqueous medium may function as a solvent or a dispersion medium. The first aqueous medium may further contain, in addition to the water and the hydrophobic solvent, a water-soluble organic solvent (first water-soluble organic solvent) as an organic solvent other than the hydrophobic solvent.

(Water)

The water has a percentage content of preferably at least 40.00% by mass and no greater than 80.00% by mass in the ink, and more preferably at least 55.00% by mass and no greater than 65.00% by mass. As a result of the percentage content of the water being set to at least 40.00% by mass and no greater than 80.00% by mass, ink ejection stability of the inkjet recording apparatus can be optimized.

(Hydrophobic Solvent)

The hydrophobic solvent is an organic solvent with an octanol/water partition coefficient Log P (also referred to below simply as Log P) of greater than 0.00. The Log P of the hydrophobic solvent is preferably greater than 0.00 and no greater than 1.50, and more preferably at least 0.20 and no greater than 0.40. As a result of the hydrophobic solvent having an Log P of greater than 0.00 and no greater than 1.50, the ink may become highly hydrophobic as its moisture content decreases by drying. Therefore, images with desired image density can be easily formed with the ink.

Any organic solvent with an Log P of greater than 0.00 is sufficient as the hydrophobic solvent, whereas the hydrophobic solvent preferably includes at least one of 3-methyl-1,5-pentanediol (Log P: 0.35) and triethylene glycol monobutyl ether (Log P: 0.44).

The hydrophobic solvent has a percentage content of at least 3.00% by mass and no greater than 30.00% by mass in the ink, and more preferably at least 9.00% by mass and no greater than 15.00% by mass. As a result of the percentage content of the hydrophobic solvent being set to at least 3.00% by mass and no greater than 30.00% by mass, the viscosity at 25° C. of the ink after the drying treatment can be easily adjusted to the aforementioned range.

(First Water-Soluble Organic Solvent)

The first water-soluble organic solvent is an organic solvent with an Log P of no greater than 0.00. The Log P of the first water-soluble organic solvent is preferably at least −2.00 and no greater than 0.00, and more preferably at least −1.50 and no greater than −0.50.

Any organic solvent with an Log P of no greater than 0.00 is sufficient as the first water-soluble organic solvent, whereas the first water-soluble organic solvent preferably includes at least one of 1,3-propanediol (Log P: −1.04) and 1,2-propanediol (Log P: −0.92).

The first water-soluble organic solvent has a percentage content of preferably at least 3.00% by mass and no greater than 30.00% by mass in the ink, and more preferably at least 15.00% by mass and no greater than 25.00% by mass. As a result of the ink containing the first water-soluble organic solvent with a percentage content of at least 3.00% by mass and no greater than 30.00% by mass, the viscosity at 25° C. of the ink after the drying treatment can be further easily adjusted to the aforementioned range.

The total percentage content of the hydrophobic solvent and the first water-soluble organic solvent is preferably greater than 3.00% by mass and no greater than 50.00% by mass in the ink, and more preferably at least 25.00% by mass and no greater than 35.00% by mass.

(Surfactant)

The surfactant optimizes compatibility and dispersion stability of each component contained in the ink. The surfactant gives the ink wettability on recording mediums. The surfactant in the ink is preferably a nonionic surfactant.

Examples of the nonionic surfactant in the ink include acetylene glycol surfactants (surfactants containing an acetylene glycol compound), silicone surfactants (surfactants containing a silicone compound), and fluorine surfactants (surfactants containing fluororesin or a fluorine-containing compound). Examples of the acetylene glycol surfactants include ethylene oxide adducts of acetylene glycol and propylene oxide adducts of acetylene glycol. The ink preferably contains an acetylene glycol surfactant.

The surfactant has a percentage content of preferably at least 0.10% by mass and no greater than 1.00% by mass in the ink, and more preferably at least 0.30% by mass and no greater than 0.60% by mass.

(Optional Component)

The ink may further contain any known additives (specific examples include a solution stabilizer, an anti-drying agent, an antioxidant, a viscosity modifier, a pH adjuster, and an antifungal agent) as necessary.

(Preferable Composition)

The ink preferably has any of Compositions 1 to 4 shown below in Table 1. Note that the values below in Table 1 are values in terms of % by mass. For example, "5.70-6.90" for Composition 1 in the column titled "Pigment" indicates that the pigment is contained with a percentage content of at least 5.70% by mass and no greater than 6.90% by mass. The same applies to the values in the other columns. "Resin" refers to pigment coating resin. "MPD", "1,3PD", "BTG", and "1,2PD" respectively refer to 3-methyl-1,5-pentanediol, 1,3-propanediol, triethylene glycol monobutyl ether, and 1,2-propanediol.

TABLE 1

| | | | Hydrophobic solvent | | Water-soluble organic solvent | | | |
|---|---|---|---|---|---|---|---|---|
| Composition | Pigment | Resin | MPD | BTG | 1,3PD | 1,2PD | Surfactant | Water |
| 1 | 5.70-6.90 | 1.30-1.50 | 18.00-22.00 | — | 9.00-11.00 | — | 0.45-0.55 | Rest |
| 2 | 5.70-6.90 | 1.30-1.50 | 9.00-11.00 | — | 18.00-22.00 | — | 0.45-0.55 | Rest |
| 3 | 5.70-6.90 | 1.30-1.50 | — | 18.00-22.00 | 18.00-22.00 | — | 0.45-0.55 | Rest |
| 4 | 5.70-6.90 | 1.30-1.50 | 9.00-11.00 | — | — | 18.00-22.00 | 0.45-0.55 | Rest |

(Ink Production Method)

The ink can be produced by mixing a pigment dispersion containing the pigment, the first aqueous medium, and an additional component (e.g., the surfactant) added as necessary, for example. In production of the ink, uniform mixing of each component may be followed by removal of foreign matter and coarse particles using a filter (e.g., a filter with a pore size of no greater than 5 m).

[Cleaning Liquid]

The cleaning liquid contains poly(meth)acrylic acid, a surfactant, and a second aqueous medium.

(Poly(Meth)Acrylic Acid)

The poly(meth)acrylic acid has a percentage content of at least 0.15% by mass and no greater than 10.50% by mass in the cleaning liquid, and preferably at least 0.15% by mass and no greater than 5.00% by mass. As a result of the percentage content of the poly(meth)acrylic acid being set to at least 0.15% by mass and no greater than 10.50% by mass, the cleaning liquid can easily remove the ink from the ejection surface of a recording head. This can optimize ink ejection stability of the inkjet recording apparatus.

The poly(meth)acrylic acid has an Mw of preferably at least 3000 and no greater than 27,000, and more preferably at least 3000 and no greater than 7000. As a result of the Mw of the poly(meth)acrylic acid being set to at least 3000 and no greater than 27,000, the cleaning liquid can reliably remove the ink from the ejection surface of a recording head. This can optimize ink ejection stability of the inkjet recording apparatus.

The Mw of the poly(meth)acrylic acid can be adjusted by changing the conditions for polymerizing the poly(meth) acrylic acid (specific examples include the amount of a polymerization initiator used, polymerization temperature, and polymerization time). Note that the poly(meth)acrylic acid may be partially or fully neutralized with a basic compound.

(Surfactant)

The surfactant is deposited in the vicinity of contaminants (e.g., pigment) adhering to a cleaning target (ink ejection surface) to perform a function of separating the contaminants from the cleaning target and a function of dispersing the separated contaminants in the cleaning liquid.

Example of the surfactant in the cleaning liquid includes the same surfactants as those listed in the description of the ink. Among the listed surfactants, a silicone surfactant (surfactant containing a silicone compound) is preferable as the surfactant in the cleaning liquid.

The surfactant has a percentage content of preferably at least 0.10% by mass and no greater than 1.00% by mass in the cleaning liquid, and more preferably at least 0.30% by mass and no greater than 0.60% by mass.

(Second Aqueous Medium)

The second aqueous medium is a medium containing water, preferably water and a water-soluble organic solvent (second water-soluble organic solvent). The second aqueous medium may function as a solvent or a dispersion medium.

(Water)

The water has a percentage content of preferably at least 55.00% by mass and no greater than 95.00% by mass in the cleaning liquid, and more preferably at least 75.00% by mass and no greater than 85.00% by mass. As a result of the percentage content of the water being set to at least 55.00% by mass and no greater than 95.00% by mass, the cleaning liquid can easily remove the ink from the ejection surface of a recording head. This can optimize ink ejection stability of the inkjet recording apparatus.

(Second Water-Soluble Organic Solvent)

The second water-soluble organic solvent is an organic solvent with an Log P of no greater than 0.00, similarly to the first water-soluble organic solvent. Preferably, the Log P of the second water-soluble organic solvent is also at least −2.00 and no greater than 0.00, and more preferably at least −1.50 and no greater than −0.50.

Examples of the second water-soluble organic solvent includes the same water-soluble organic solvents as those listed in the description of the first water-soluble organic solvent. The first water-soluble organic solvent and the second water-soluble organic solvent may be the same as or different from each other, and preferably they are the same as each other. Preferably, the second water-soluble organic solvent is 1,3-propanediol. Accordingly, it is preferable that the first water-soluble organic solvent and the second water-soluble organic solvent each are 1,3-propanediol.

The second water-soluble organic solvent has a percentage content of preferably at least 5.00% by mass and no greater than 30.00% by mass in the cleaning liquid, and more preferably at least 15.00% by mass and no greater than 25.00% by mass. As a result of containing the second water-soluble organic solvent with a percentage content of at least 5.00% by mass and no greater than 35.00% by mass, the cleaning liquid can easily remove the ink from the ejection surface of a recording head. This can optimize ink ejection stability of the inkjet recording apparatus.

(Optional Component)

The cleaning liquid may further contain a basic compound as an additive (pH adjuster) as necessary. The basic compound that may be contained in the cleaning liquid is preferably sodium hydroxide. The cleaning liquid may further contain any known additives (specific examples include a solution stabilizer, an anti-drying agent, an antioxidant, a viscosity modifier, and an antifungal agent) as necessary.

(Preferable Composition)

The cleaning liquid preferably has any of Compositions 1 to 4 shown below in Table 2. Note that the values below in Table 2 are values in terms of % by mass. For example, "18.00-22.00" for Composition 2 in the column titled "1,3PD" indicates that 1,3PD is contained with a percentage content of at least 18.00% by mass and no greater than 22.00% by mass. The same applies to the values in the other columns. "1,3PD" refers to 1,3-propanediol. "PA1" refers to polyacrylic acid with an Mw of 5000. "PA2" refers to polyacrylic acid with an Mw of 25,000.

TABLE 2

| Composition | 1,3PD | Surfactant | PA1 | PA2 | Water |
|---|---|---|---|---|---|
| 1 | 18.00-22.00 | 0.45-0.55 | 0.90-1.10 | — | Rest |
| 2 | 18.00-22.00 | 0.45-0.55 | 0.18-0.22 | — | Rest |
| 3 | 18.00-22.00 | 0.45-0.55 | 9.00-10.50 | — | Rest |
| 4 | 18.00-22.00 | 0.45-0.55 | — | 0.90-1.10 | Rest |

(Cleaning Liquid Production Method)

The cleaning liquid can be produced by mixing poly (meth)acrylic acid, the surfactant, the second aqueous medium, and a component (e.g., an aqueous solution of the basic compound) added as necessary, for example. In production of the cleaning liquid, uniform mixing of each component may be followed by removal of foreign matter and coarse particles using a filter (e.g., a filter with a pore size of no greater than 5 μm).

Second Embodiment: Inkjet Recording Apparatus

The following describes an inkjet recording apparatus according to a second embodiment of the present disclosure. The inkjet recording apparatus according to the present embodiment includes an ink, a cleaning liquid, and a recording head. The recording head includes a recording section that has an ink ejection surface and that ejects the ink onto an image formation area of a recording medium and a cleaning section that cleans the ink ejection surface of the recording section with the cleaning liquid. The ink contains a pigment and a first aqueous medium. The first aqueous medium contains a hydrophobic solvent and water. The ink has a viscosity at 25° C. of at least 120 mPa·S and no greater than 3800 mPa·S after a drying treatment. The drying treatment is a treatment to heat the ink at 40° C. until the mass of the ink is reduced by 30.00% by mass. The cleaning liquid contains poly(meth)acrylic acid, a surfactant, and a second aqueous medium. The poly(meth)acrylic acid has a percentage content of at least 0.15% by mass and no greater than 10.50% by mass in the cleaning liquid.

The ink and the cleaning liquid included in the inkjet recording apparatus according to the present embodiment are respectively the same as the ink and the cleaning liquid included in the ink set of the first embodiment. As such, the inkjet recording apparatus according to the present embodiment is an inkjet recording apparatus including a recording head that uses the ink set according to the first embodiment. Note that the details of the ink set have already been described and description thereof is therefore omitted. The inkjet recording apparatus according to the present embodiment, which uses the ink set according to the first embodiment, can form images with desired image density and facilitate ink removal by cleaning.

[Configuration of Inkjet Recording Apparatus]

The inkjet recording apparatus according to the present embodiment is described below with reference to the accompanying drawings. Note that the drawings schematically illustrate elements of configuration in order to facilitate understanding. Properties such as the size and number of each element of configuration illustrated in the drawings may differ from actual properties in order to facilitate preparation of the drawings. The properties such the size and number of each element of configuration may be changed as appropriate.

FIG. 1 is a diagram illustrating main components of an inkjet recording apparatus 1 which is an example of the inkjet recording apparatus according to the present embodiment. The inkjet recording apparatus 1 illustrated in FIG. 1 includes recording head section 2, a head housing 3 that holds the recording head section 2, and a conveyance unit 4 that conveys a recording medium sheet (not illustrated). The recording head section 2 includes a first recording head 2*a*, a second recording head 2*b*, a third recording head 2*c*, and a fourth recording head 2*d*. The conveyance unit 4 includes a pair of a first roller 4*a* and a second roller 4*b* and a conveyor belt 4*c* wound between the first roller 4*a* and the second roller 4*b*. The conveyance unit 4 conveys the recording medium sheet placed on the conveyor belt 4*c* in a given direction (rightward direction indicated by the arrow in FIG. 1). In the following, the direction in which the recording medium sheet is conveyed may be referred to as a conveyance direction X. The first recording head 2*a*, the second recording head 2*b*, the third recording head 2*c*, and the fourth recording head 2*d* each perform image formation by ink ejection when the recording medium sheet is conveyed directly therebelow.

The first recording head 2*a*, the second recording head 2*b*, the third recording head 2*c*, the fourth recording head 2*d*, and the conveyance unit 4 are supported at a height corresponding to a given length from the upper surface of the conveyor belt 4*c*.

The first recording head 2*a*, the second recording head 2*b*, the third recording head 2*c*, and the fourth recording head 2*d* each record (form) an image on the recording medium sheet conveyed on the conveyor belt 4*c*. The first recording head 2*a*, the second recording head 2*b*, the third recording head 2*c*, and the fourth recording head 2*d* each include a non-illustrated ink tank. The ink tanks of the first recording head 2*a*, the second recording head 2*b*, the third recording head 2*c*, and the fourth recording head 2*d* contain respective inks (a first ink, a second ink, a third ink, and a fourth ink) of different colors (black, cyan, magenta, and yellow). The first recording head 2*a*, the second recording head 2*b*, the third recording head 2*c*, and the fourth recording head 2*d* each eject the ink contained in a corresponding one of the non-illustrated ink tanks onto the recording medium sheet through a nozzle. Note that the first recording head 2*a*, the second recording head 2*b*, the third recording head 2*c*, and the fourth recording head 2*d* perform ink jetting onto the recording medium sheet in a given order at given ejection intervals. Thus, a color image is formed on the recording medium sheet.

Figure 2:
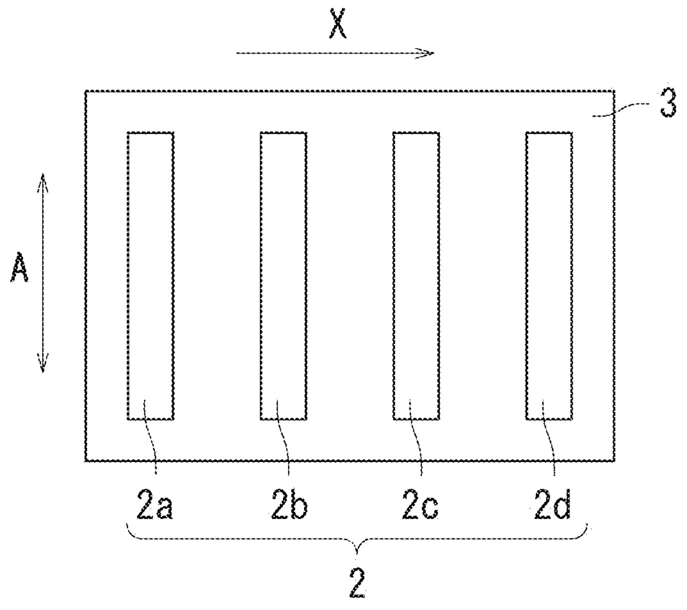
FIG. 2 is a diagram illustrating recording heads and the lower surface of a head housing in FIG. 1.

FIG. 2 is a diagram illustrating the recording head section 2 and the lower surface of the head housing in FIG. 1. The first recording head 2*a*, the second recording head 2*b*, the third recording head 2*c*, and the fourth recording head 2*d* extend in a direction (also referred to below as a width direction A) perpendicular to the conveyance direction X.

The first recording head 2*a*, the second recording head 2*b*, the third recording head 2*c*, and the fourth recording head 2*d* have substantially the same configuration as each other. Therefore, the recording head section 2 is described below using the first recording head 2*a* as an example. However, the same applies to the second recording head 2*b*, the third recording head 2*c*, and the fourth recording head 2*d*.

Figure 3:
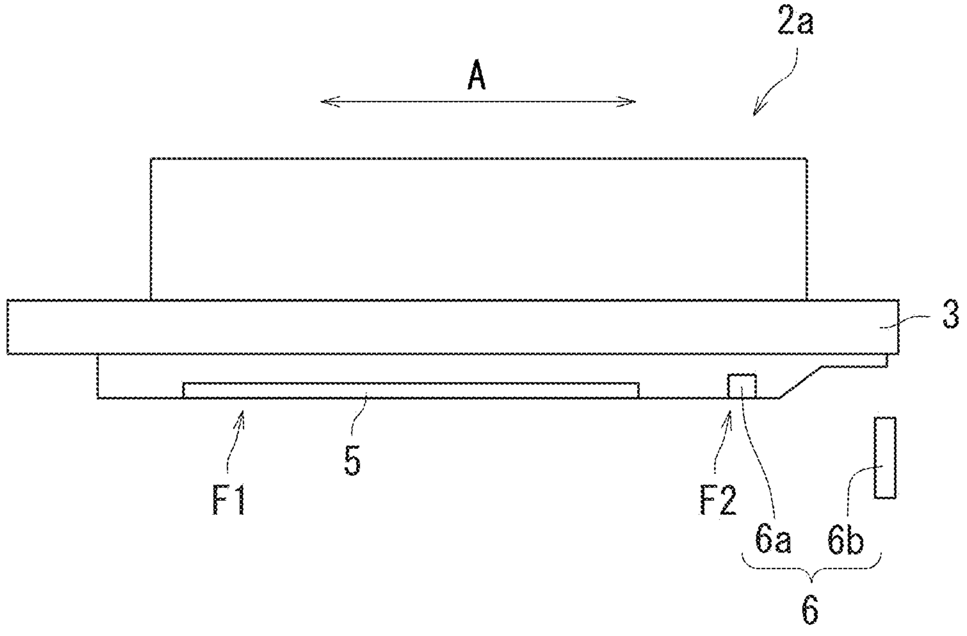
FIG. 3 is a diagram illustrating a side surface of a first recording head in FIG. 1.

FIG. 3 is a diagram illustrating a side surface of the first recording head 2*a* of FIG. 1. As illustrated in FIG. 3, the first recording head 2*a* includes a recording section 5 that has an ink ejection surface and that ejects the ink onto an image formation area of the recording medium sheet, and a cleaning section 6 that cleans the ink ejection surface F1 of the recording section 5 with the cleaning liquid.

Non-illustrated nozzles, from which the ink is ejected, are arranged in rows in the ink ejection surface F1 serving as the lower surface of the recording section 5.

As illustrated in FIG. 3, the cleaning section 6 includes a wiper 6*b* and a cleaning liquid supply section 6*a* provided in the vicinity of the ink ejection surface F1 of the recording section 5. The cleaning liquid supply section 6*a* has a lower surface serving as a cleaning liquid supply surface F2 with a plurality of non-illustrated cleaning liquid ejection holes from which the cleaning liquid is ejected. The cleaning liquid supply section 6*a* supplies the cleaning liquid stored in the non-illustrated cleaning liquid tank to the cleaning liquid supply surface F2 through the cleaning liquid ejection holes. The wiper 6*b* has a function of wiping the ink ejection surface F1. The wiper 6*b* is a rubber wiper, for example. The wiper 6*b* has a linear pressure of at least 5.0 N/m and no greater than 13.0 N/m, for example.

Figure 4:
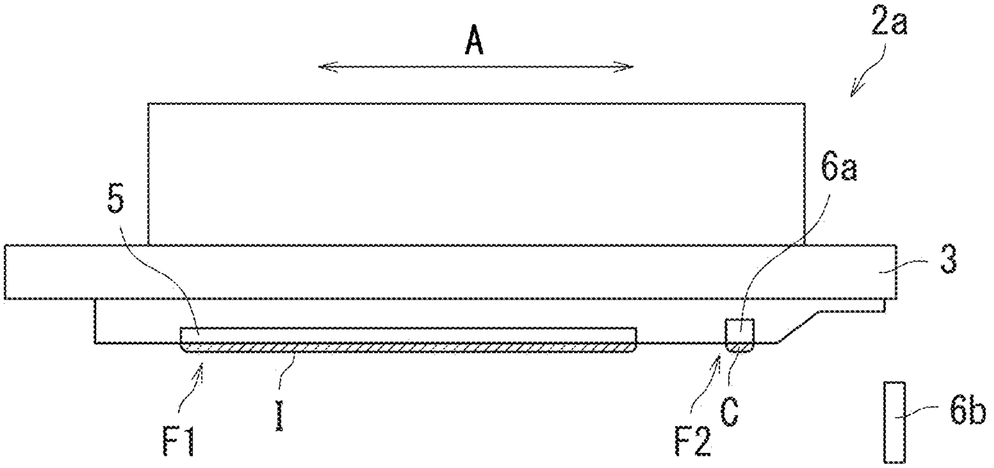
FIG. 4 is a diagram depicting one process of a cleaning operation performed by the inkjet recording apparatus of FIG. 1.

FIGS. 4 to 7 depict a series of processes of a cleaning operation performed by the inkjet recording apparatus 1. As depicted in FIG. 4, a small amount of an ink I is purged first from the recording section 5 (purging operation) in the cleaning operation. The purging operation eliminates nozzle clogging in the recording section 5. The ink I, after being purged, is attached onto the ink ejection surface F1 of the recording section 5. In the cleaning operation, a cleaning liquid C is supplied from the cleaning liquid supply section 6*a* (cleaning liquid supply operation) during the purging operation. The supplied cleaning liquid C is attached to the vicinity (the cleaning liquid supply surface F2 as the lower surface of the cleaning liquid supply section 6*a*) of the ink ejection surface F1 of the recording section 5.

Figure 5:
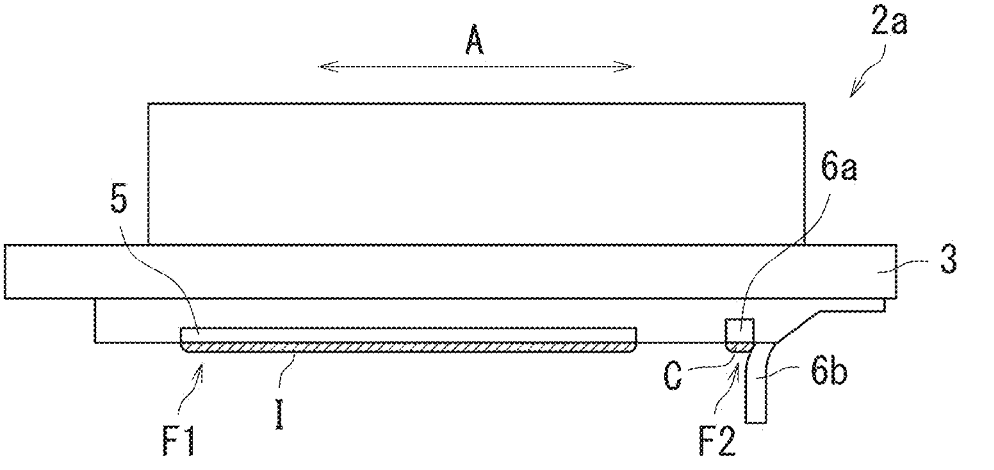
FIG. 5 is a diagram depicting a process performed next to the process of FIG. 4.
Figure 6:
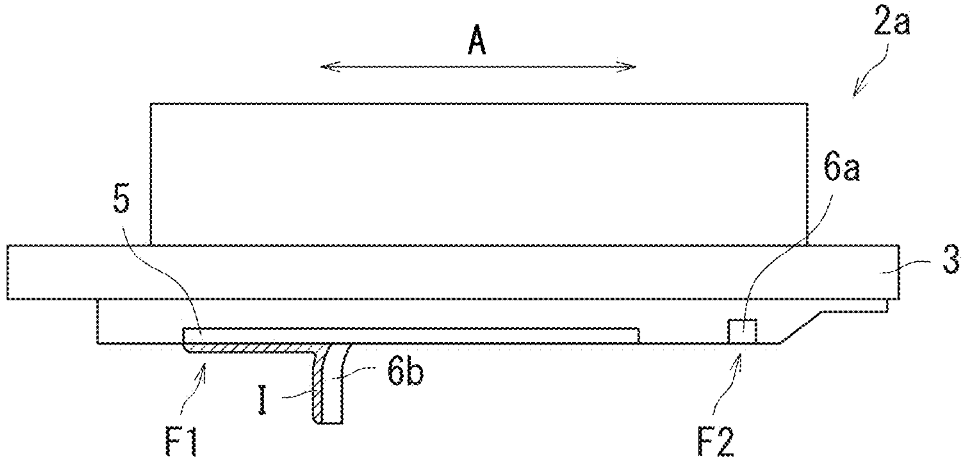
FIG. 6 is a diagram depicting a process performed next to the process of FIG. 5.
Figure 7:
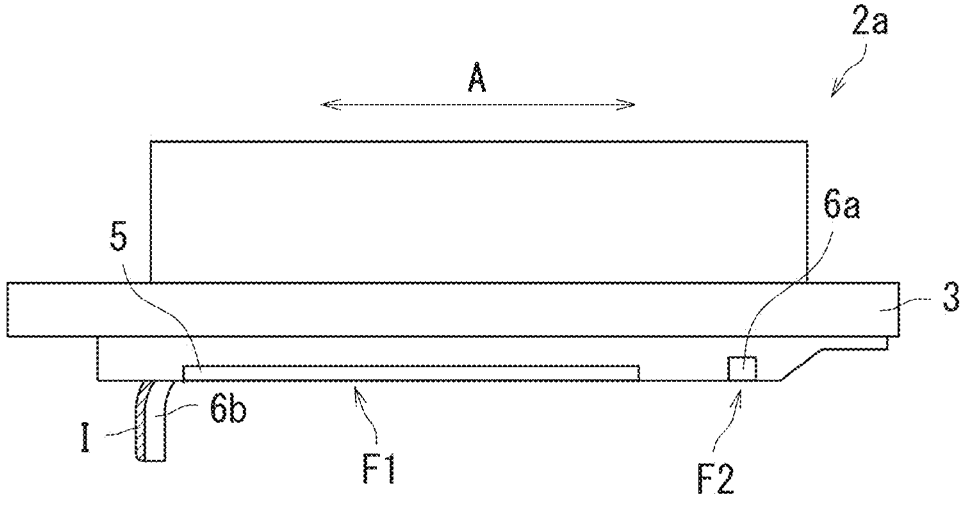
FIG. 7 is a diagram depicting a process performed next to the process of FIG. 6.

Next, the wiper **6*b* is pressed against the cleaning liquid supply surface F2 as the lower surface of the cleaning liquid supply section 6*a* as depicted in FIG. 5 Next, the wiper 6*b* moves horizontally (leftward in FIG. 6) as depicted in FIG. 6. Thus, the wiper 6*b* wipes off (wiping operation) the cleaning liquid C attached to the cleaning liquid supply surface F2 together with and the ink I attached to the ink ejection surface F1. In doing so, the cleaning liquid C is mixed with the ink I. As a result, the cleaning liquid C attached to the cleaning liquid supply surface F2 and the ink attached to the ink ejection surface F1 are removed as depicted in FIG. 7. In the manner described above, the recording section 5*s*** is cleaned with the cleaning liquid C.

The series of processes of the cleaning operation by the inkjet recording apparatus 1 is described so far. Note that the second recording head **2*b*, the third recording head 2*c*, and the fourth recording head 2*d* each include a recording section 5 that has an ink ejection surface F1 and that ejects the ink and a cleaning section 6 that cleans the ink ejection surface F1 of the recording section 5 with the cleaning liquid. The cleaning section 6 of each of the second recording head 2*b*, the third recording head 2*c*, and the fourth recording head 2*d* also includes a wiper 6*b* and a cleaning liquid supply section 6*a* provide in the vicinity of the ink ejection surface F1 of the recording section 5**.

One example of the inkjet recording apparatus according to the present embodiment has been described so far. However, the inkjet recording apparatus according to the present embodiment is not limited to that illustrated in FIGS. 1 to 7.

The inkjet recording apparatus 1 that includes four line recording heads corresponding to inks of four colors as recording heads has been described as an example with reference to FIG. 1 to 7. However, the number of the recording heads included in the inkjet recording apparatus according to the present embodiment is not particularly limited and can range from at least 1 to 10, with a preference for between 3 and 5.

The type, combination, and ejection order of the inks are not particularly limited in the inkjet recording apparatus according to the present embodiment.

The inkjet recording apparatus 1 that includes, in each of the recording heads **2*a* to 2*d*, the cleaning section 6 including the wiper 6*b* and the cleaning liquid supply section 6*a* provided in the vicinity of the ink ejection surface F1 of the recording section 5 has been described as an example with reference to FIGS. 1 to 7. However, the inkjet recording apparatus according to the present embodiment may be an inkjet recording apparatus that performs a wiping operation by directly applying a cleaning liquid to a wiper. The cleaning sections of the inkjet recording apparatus according to the present embodiment only need to be able clean the ink ejection surfaces F1 of the corresponding recording sections 5** with the cleaning liquid.

The inkjet recording apparatus according to the present embodiment may be a multifunction peripheral having a function of a scanner, a copier, a printer, or a facsimile machine.

The recording medium sheet to be subjected to image formation by the inkjet recording apparatus according to the present embodiment is preferably a sheet of a permeable recording medium (e.g., plain paper). When image formation is performed on plain paper using a known inkjet recording apparatus (particularly, a known inkjet recording apparatus including line recording heads), image density of formed images tends to be insufficient. By contrast, the inkjet recording apparatus according to the present embodiment can form images with desired image density even on plain paper.

EXAMPLES

The following describes examples of the present disclosure. However, the present disclosure is not limited to the following examples.

[Ink Sets]

Ink sets of Examples and Comparative Examples were prepared by the methods described below. Materials used are described first. Table 3 shows the details of the organic solvents used in Examples and Comparative Examples. Note that 3-methyl-1,5-pentanediol and triethylene glycol monobutyl ether each were a hydrophobic solvent.

TABLE 3

| | Selling agency | LogP |
|---|---|---|
| 3-Methyl-1,5-pentanediol | Tokyo Chemical Industry Co., Ltd. | 0.35 |
| Triethylene glycol monobutyl ether | Tokyo Chemical Industry Co., Ltd. | 0.44 |
| 1,3-Propanediol | Tokyo Chemical Industry Co., Ltd. | −1.04 |
| 1,2-Propanediol | Tokyo Chemical Industry Co., Ltd. | −0.92 |

[Ink Preparation]

Inks (I-1) to (I-5) used in Examples and Comparative Examples were prepared by the methods described below. Table 4 below shows the compositions of the inks.

(Pigment Dispersion Preparation)

Using a disperser, 18.00 parts by mass of carbon black ("BLACK PEARLS (registered Japanese trademark) 800", product of Cabot Corporation) as a black pigment, 4.00 parts by mass of a pigment coating resin ("DISPERBYK (registered Japanese trademark)-190", product of BYK Chemie Japan, K.K.), and 78.00 parts by mass of ion exchange water were mixed. The resulting mixed liquid underwent dispersion treatment using a bead mill until the $D_{50}$ of the pigment particles reached 110 nm. The $D_{50}$ of the pigment particles was measured using a dynamic light scattering type particle size distribution analyzer ("ZETASIZER (registered Japanese trademark) NANO ZS", product of Malvern Instruments Ltd.). Through the above, a black pigment dispersion was obtained as a pigment dispersion.

(Preparation of Ink (I-1))

A mixed liquid was obtained by mixing 35.00 parts by mass of the black pigment dispersion (6.30 parts by mass of the black pigment, 1.40 parts by mass of the pigment coating resin, and 27.30 parts by mass of ion exchange water), 20.00 parts by mass of 3-methyl-1,5-pentanediol, 10.00 parts by mass of 1,3-propanediol, 0.50 parts by mass of a surfactant ("SURFYNOL (registered Japanese trademark) 420", product of Nissin Chemical Industry Co., Ltd., acetylene surfactant), and 34.50 parts by mass of ion exchange water.

The resulting mixed liquid was stirred at a rotational speed of 400 rpm using a stirrer ("THREE-ONE MOTOR BL-600", product of Shinto Scientific Co., Ltd.). Next, the stirred mixed liquid was filtered using a filter with a pore diameter of 5 m to remove foreign matter and coarse particles. As a result, the ink (I-1) was obtained.

(Preparation of Inks (I-2) to (I-5))

The inks (I-2) to (I-5) were prepared according to the same method as that for preparing the ink (I-1) in all aspects other than that the types and amounts of raw materials used were changed to those shown below in Table 4. The numbers below in Table 4 each indicate the mass of a corresponding component in terms of part by mass. "Resin" refers to a pigment coating resin. "MPD", "1,3PD", "BTG", and "1,2PD" respectively refer to 3-methyl-1,5-pentanediol, 1,3-propanediol, triethylene glycol monobutyl ether, and 1,2-propanediol.

TABLE 4

| | | | Hydrophobic aqueous solvent | | Water-soluble organic solvent | | | | |
|---|---|---|---|---|---|---|---|---|---|
| Ink | Pigment | Resin | MPD | BTG | 1,3PD | 1,2PD | Surfactant | Water | Total |
| I-1 | 6.30 | 1.40 | 20.00 | — | 10.00 | — | 0.50 | 61.80 | 100.00 |
| I-2 | 6.30 | 1.40 | 10.00 | — | 20.00 | — | 0.50 | 61.80 | 100.00 |
| I-3 | 6.30 | 1.40 | 8.00 | — | 22.00 | — | 0.50 | 61.80 | 100.00 |
| I-4 | 6.30 | 1.40 | — | 20.00 | 20.00 | — | 0.50 | 51.80 | 100.00 |
| I-5 | 6.30 | 1.40 | 10.00 | — | — | 20.00 | 0.50 | 61.80 | 100.00 |

[Cleaning Liquid Preparation]

Cleaning liquids (C-1) to (C-9) used in Examples and Comparative Examples were prepared by the methods described below. Table 5 below shows the compositions of the cleaning liquids.

(Preparation of Cleaning Liquid (C-1))

A mixed liquid was obtained by mixing 78.40 parts by mass of ion exchange water, 20.00 parts by mass of 1,3-propanediol, 0.50 parts by mass of a surfactant ("SILFACE (registered Japanese trademark) SAG503A", product of Nissin Chemical Industry Co., Ltd., silicone surfactant), 0.10 parts by mass of 1N sodium hydroxide aqueous solution, and 1.00 part by mass of polyacrylic acid ("POLYACRYLIC ACID 5000", product of FUJIFILM Wako Pure Chemical Corporation, Mw=5000). The resulting mixed liquid was used as the cleaning liquid (C-1).

(Preparation of Cleaning Liquids (C-2) to (C-9))

The cleaning liquids (C-2) to (C-9) were prepared according to the same method as that for preparing the cleaning liquid (C-1) in all aspects other than that the types and amounts of raw materials used were changed to those shown below in Table 5. The numbers below in Table 5 each indicate the mass of a corresponding component in terms of part by mass. "CL" refers to a cleaning liquid. "1,3PD" refers to 1,3-propanediol. "SA" refers to a surfactant. "PA1" refers to polyacrylic acid with an Mw of 5000. In the following, "POLYACRYLIC ACID 5000" produced by FUJIFILM Wako Pure Chemical Corporation was used as the polyacrylic acid with an Mw of 5000 as indicated above. "PA2" refers to polyacrylic acid with an Mw of 2,5000. In the following, "POLYACRYLIC ACID 25000" produced by FUJIFILM Wako Pure Chemical Corporation was used as the polyacrylic acid with an Mw of 2,5000. "STPP" and "CMC" refer to sodium tripolyphosphate and sodium carboxymethylcellulose, respectively. In the following, sodium tripolyphosphate and sodium carboxymethylcellulose produced by FUJIFILM Wako Pure Chemical Corporation were used as the sodium tripolyphosphate and the sodium carboxymethylcellulose, respectively.

TABLE 5

| CL | 1,3PD | SA | PA1 | PA2 | STPP | CMC | Water | Total |
|---|---|---|---|---|---|---|---|---|
| C-1 | 20.00 | 0.50 | 1.00 | — | — | — | 78.40 | 100.00 |
| C-2 | 20.00 | 0.50 | 0.20 | — | — | — | 79.20 | 100.00 |
| C-3 | 20.00 | 0.50 | 10.00 | — | — | — | 69.40 | 100.00 |
| C-4 | 20.00 | 0.50 | — | — | — | — | 79.40 | 100.00 |
| C-5 | 20.00 | 0.50 | 0.10 | — | — | — | 79.30 | 100.00 |
| C-6 | 20.00 | 0.50 | 11.00 | — | — | — | 68.40 | 100.00 |
| C-7 | 20.00 | 0.50 | — | 1.00 | — | — | 78.40 | 100.00 |
| C-8 | 20.00 | 0.50 | — | — | 1.00 | — | 78.40 | 100.00 |
| C-9 | 20.00 | 0.50 | — | — | — | 1.00 | 78.40 | 100.00 |

[Ink Set Preparation]

As shown below in Table 6, one of the inks (I-1) to (I-5) and one of the cleaning liquids (C-1) to (C-9) were combined. By the combination, ink sets of Examples 1 to 7 and Comparative Examples 1 to 6 were prepared.

[Viscosity Measurement]

Measurement of the viscosity of each of the inks (I-1) to (I-5) before and after the drying treatment was performed using a torque balanced servo rotational viscometer ("TV-100EL", product of Toki Sangyo Co., Ltd.) in the examples.

(Measurement of Ink Viscosity Before Drying Treatment)

The viscosity (initial viscosity) at 25° C. of each of the inks (I-1) to (I-5), each being a measurement target, before the drying treatment was measured by the method described above. Table 6 below shows the measurement results.

(Measurement of Ink Viscosity after Drying Treatment)

Into a Schale, 100.00 parts by mass of the ink (specifically, any of the inks (I-1) to (I-5)) being a measurement target was charged. The Schale was placed in an oven at 40° C. and the drying treatment was performed thereon. During the drying treatment, the mass of the measurement target in the Schale was measured over time. When the mass of the measurement target in the Schale was reduced to 70.00 parts by mass (when the mass of the measurement target was reduced by 30.00% by mass), the drying treatment was terminated. The viscosity (dry viscosity) at 25° C. of each of the inks (I-1) to (I-5), each being a measurement target, after the drying treatment was measured by the aforementioned method. Table 6 below shows the measurement results.

[Evaluation]

Using the evaluation apparatuses described below, cleaning ability and image density of formed images were evaluated for the ink sets of Examples 1 to 7 and Comparative Examples 1 to 6. Note that cleaning ability means ease with which an ink is removed from the ejection surface of a recording head during cleaning performed by an inkjet recording apparatus. Unless otherwise stated, the recording medium (evaluation paper) used was A4-size plain paper "COLOR COPY (registered Japanese trademark)", product of Mondi plc, basis weight 90 $g/m^2$). Table 6 below shows the evaluation results.

[Image Density]

Evaluation of image density was performed in an environment at a temperature of 25° C. and a relative humidity of 50%. The evaluation apparatus (inkjet recording apparatus) used for image density evaluation was a printing test apparatus (product of KYOCERA Document Solutions Japan Inc.) including a line recording head that performs piezoelectric ink ejection. Using the evaluation apparatus for image density evaluation, a solid image was formed on a sheet of the recording medium with any of the inks of (I-1) to (I-5). The image density (ID value) of the formed solid image was measured using a fluorescence spectrodensitometer ("FD-5", product of KONICA MINOLTA, INC.). Image density was evaluated according to the following criteria.

(Evaluation Criterial of Image Density)

A (good): ID value of 1.20 or more

B (poor): ID value of less than 1.20

[Cleaning Ability]

Evaluation of cleaning ability on the ejection surface of a recording head was performed in a normal-temperature and normal-humidity environment (environment at a temperature of 25° C. and a relative humidity of 60%). The evaluation apparatus used for cleaning ability evaluation was an inkjet recording apparatus (modified version of inkjet color production printer, "TASKALFA PRO15000C", product of KYOCERA Document Solutions Japan Inc.) including a recording head. The recording head included a recording section configured to perform ink ejection and a cleaning section configured to clean an ink ejection surface of the recording section with a cleaning liquid. The cleaning section included a cleaning liquid supply section configured to supply the cleaning liquid to a cleaning liquid supply surface in the vicinity of the ink ejection surface of the recording section and a wiper (linear pressure: 8.0 N/m) configured to wipe the ink ejection surface. The ink (specifically, any of the inks (I-1) to (I-5)) included in a corresponding one of the ink sets, each being an evaluation target, was loaded into an ink tank of the evaluation apparatus. In addition, the cleaning liquid (specifically, any of the cleaning liquids (C-1) to (C-9)) included in the ink set, being the evaluation target, was loaded into a cleaning liquid tank of the evaluation apparatus. Using the evaluation apparatus for cleaning ability evaluation, an image with a printing rate of 4% was consecutively printed (printing operation) on 1000 sheets of the recording medium with the ink (specifically, any of the inks (I-1) to (I-5)) included in a corresponding one of the ink sets. After the printing operation, the purging operation, the cleaning liquid supply operation, and the wiping operation were performed as the cleaning operation. A set of the printing operation and the cleaning operation (the purging operation, the cleaning liquid supply operation, and the wiping operation) was repeated 10 times. Thereafter, the ejection surface of the recording head was visually observed to check for the presence or absence of residual ink that was not cleaned off. Cleaning ability was evaluated according to the following criteria.

(Evaluation Criteria of Cleaning Ability)

A (good): ejection surface with no ink attached thereon

B (poor): ejection surface with ink attached thereon

Each of the inks (specifically, the inks (I-1), (I-2), (I-4), and (I-5)) in the ink sets of Examples 1 to 7 contained a pigment and an aqueous medium (first aqueous medium). The first aqueous medium contained a hydrophobic solvent. The ink had a viscosity (dry viscosity) at 25° C. of at least 120 mPa·S and no greater than 3800 mPa·S after the drying treatment (treatment to heat the ink at 40° C. until the mass of the ink is reduced by 30.00% by mass). Each of the cleaning liquids (specifically, the cleaning liquids (C-1) to (C-3) and (C-7)) of the ink sets of Examples 1 to 7 contained poly(meth)acrylic acid, a surfactant, and an aqueous medium (second aqueous medium). The poly(meth)acrylic acid had a percentage content of at least 0.15% by mass and no greater than 10.50% by mass in the cleaning liquid. The ink sets of Examples 1 to 7 formed images with high image density, that is, desired image density, even on the plain paper. Furthermore, the ink sets of Examples 1 to 7 easily removed ink on the ejection surface of the recording head of the inkjet recording apparatus by cleaning.

By contrast, the ink (I-3) of the ink set of Comparative Example 1 had a low dry viscosity, less than 120 mPa·S, and formed images with insufficient image density.

The ink set of Comparative Example 2 including the ink (I-2) and the cleaning liquid (C-4) formed images with desired image density even on the plain paper as a result of using the ink (I-2). However, use of the cleaning liquid (C-4) not containing poly(meth)acrylic acid resulted in the ink (I-2) remaining on the ejection surface of the recording head of the inkjet recording apparatus after cleaning. As described above, cleaning with the cleaning liquid (C-4) containing no poly(meth)acrylic acid thoroughly removed the ink (I-3) having a low dry viscosity of less than 120 mPa·S in Comparative Example 1 from the ejection surface, but did not thoroughly remove an ink having a high dry viscosity, such as the ink (I-2) in the Comparative Example 2, from the ejection surface.

In Comparative Example 3 or 4, the cleaning liquid (C-5) or (C-6) containing poly(meth)acrylic acid with a percentage content of less than 0.15% by mass or greater than 10.50% by mass did not thoroughly remove an ink with a high dry viscosity, such as the inks (I-1) or (I-2).

In addition, an ink with high dry viscosity, such as the ink (I-2), was not thoroughly removed from the ejection surface

TABLE 6

| | Ink | Initial viscosity [mPa · S] | Dry viscosity [mPa · S] | Image density ID value | Image density Rating | Cleaning liquid | Cleaning ability |
|---|---|---|---|---|---|---|---|
| Example 1 | I-1 | 8.7 | 3279 | 1.25 | A | C-1 | A |
| Example 2 | I-2 | 7.1 | 149 | 1.20 | A | C-1 | A |
| Example 3 | I-2 | 7.1 | 149 | 1.20 | A | C-2 | A |
| Example 4 | I-2 | 7.1 | 149 | 1.20 | A | C-3 | A |
| Comparative Example 1 | I-3 | 6.9 | 88 | 1.18 | B | C-4 | A |
| Comparative Example 2 | I-2 | 7.1 | 149 | 1.20 | A | C-4 | B |
| Comparative Example 3 | I-1 | 8.7 | 3279 | 1.25 | A | C-5 | B |
| Comparative Example 4 | I-2 | 7.1 | 149 | 1.20 | A | C-6 | B |
| Example 5 | I-4 | 8.2 | 241 | 1.21 | A | C-1 | A |
| Example 6 | I-5 | 7.3 | 163 | 1.20 | A | C-1 | A |
| Example 7 | I-2 | 7.1 | 149 | 1.20 | A | C-7 | A |
| Comparative Example 5 | I-2 | 7.1 | 149 | 1.20 | A | C-8 | B |
| Comparative Example 6 | I-2 | 7.1 | 149 | 1.20 | A | C-9 | B |

As shown in Tables 3 to 6, the ink sets of Examples 1 to 7 each included one of the inks (I-1), (I-2), (I-4), and (I-5) and one of the cleaning liquids (C-1) to (C-3) and (C-7). even with the cleaning liquid (C-8) or (C-9) containing a known builder instead of poly(meth)acrylic acid as in Comparative Example 5 or 6.

What is claimed is:

1. An ink set comprising:

an inkjet ink; and a cleaning liquid, wherein the inkjet ink contains a pigment and a first aqueous medium, the first aqueous medium contains a hydrophobic solvent and water, the inkjet ink has a viscosity at 25° C. of at least 120 mPa·S and no greater than 1750 mPa·S after a drying treatment, the drying treatment is a treatment to heat the inkjet ink at 40° C. until a mass of the inkjet ink is reduced by 30.00% by mass, the first aqueous medium further contains a first water-soluble organic solvent, the first water-soluble organic solvent has an octanol/water partition coefficient Log P of at least −2.00 and no greater than 0.00, a percentage content of the first water-soluble organic solvent is at least 15.00% by mass and no greater than 25.00% by mass in the inkjet ink, the cleaning liquid contains polyacrylic acid and/or polymethacrylic acid, a surfactant, and a second aqueous medium, and the polyacrylic acid and/or polymethacrylic acid has a percentage content of at least 0.15% by mass and no greater than 10.50% by mass in the cleaning liquid.

2. An inkjet recording apparatus comprising:

the ink set according to claim 1; and a recording head, wherein the recording head includes:

a recording section that has an ink ejection surface and that ejects the inkjet ink onto an image formation area of a recording medium; and a cleaning section comprising a wiper that cleans the ink ejection surface of the recording section with the cleaning liquid.

3. The ink set according to claim 1, wherein the inkjet ink further contains a pigment coating resin, a percentage content of the pigment is at least 5.70% by mass and no greater than 6.90% by mass in the inkjet ink, a percentage content of the pigment coating resin is at least 1.30% by mass and no greater than 1.50% by mass in the inkjet ink, a percentage content of the hydrophobic solvent is at least 9.00% by mass and no greater than 11.00% by mass in the inkjet ink, a percentage content of the first water-soluble organic solvent is at least 18.00% by mass and no greater than 22.00% by mass in the inkjet ink, a percentage content of the surfactant is at least 0.45% by mass and no greater than 0.55% by mass in the inkjet ink, the hydrophobic solvent is 3-methyl-1,5-pentanediol, and the first water-soluble organic solvent is 1,3-propanediol.

4. The ink set according to claim 1, wherein the inkjet ink further contains a pigment coating resin, a percentage content of the pigment is at least 5.70% by mass and no greater than 6.90% by mass in the inkjet ink, a percentage content of the pigment coating resin is at least 1.30% by mass and no greater than 1.50% by mass in the inkjet ink, a percentage content of the hydrophobic solvent is at least 18.00% by mass and no greater than 22.00% by mass in the inkjet ink, a percentage content of the first water-soluble organic solvent is at least 18.00% by mass and no greater than 22.00% by mass in the inkjet ink, a percentage content of the surfactant is at least 0.45% by mass and no greater than 0.55% by mass in the inkjet ink, the hydrophobic solvent is triethylene glycol monobutyl ether, and the first water-soluble organic solvent is 1,3-propanediol.

5. The ink set according to claim 1, wherein the inkjet ink further contains a pigment coating resin, a percentage content of the pigment is at least 5.70% by mass and no greater than 6.90% by mass in the inkjet ink, a percentage content of the pigment coating resin is at least 1.30% by mass and no greater than 1.50% by mass in the inkjet ink, a percentage content of the hydrophobic solvent is at least 9.00% by mass and no greater than 11.00% by mass in the inkjet ink, a percentage content of the first water-soluble organic solvent is at least 18.00% by mass and no greater than 22.00% by mass in the inkjet ink, a percentage content of the surfactant is at least 0.45% by mass and no greater than 0.55% by mass in the inkjet ink, the hydrophobic solvent is 3-methyl-1,5-pentanediol, and the first water-soluble organic solvent is 1,2-propanediol.

* * * * *